No. 774,965. PATENTED NOV. 15, 1904.
H. A. DAVENPORT.
SPLIT PULLEY.
APPLICATION FILED FEB. 27, 1904.
NO MODEL.
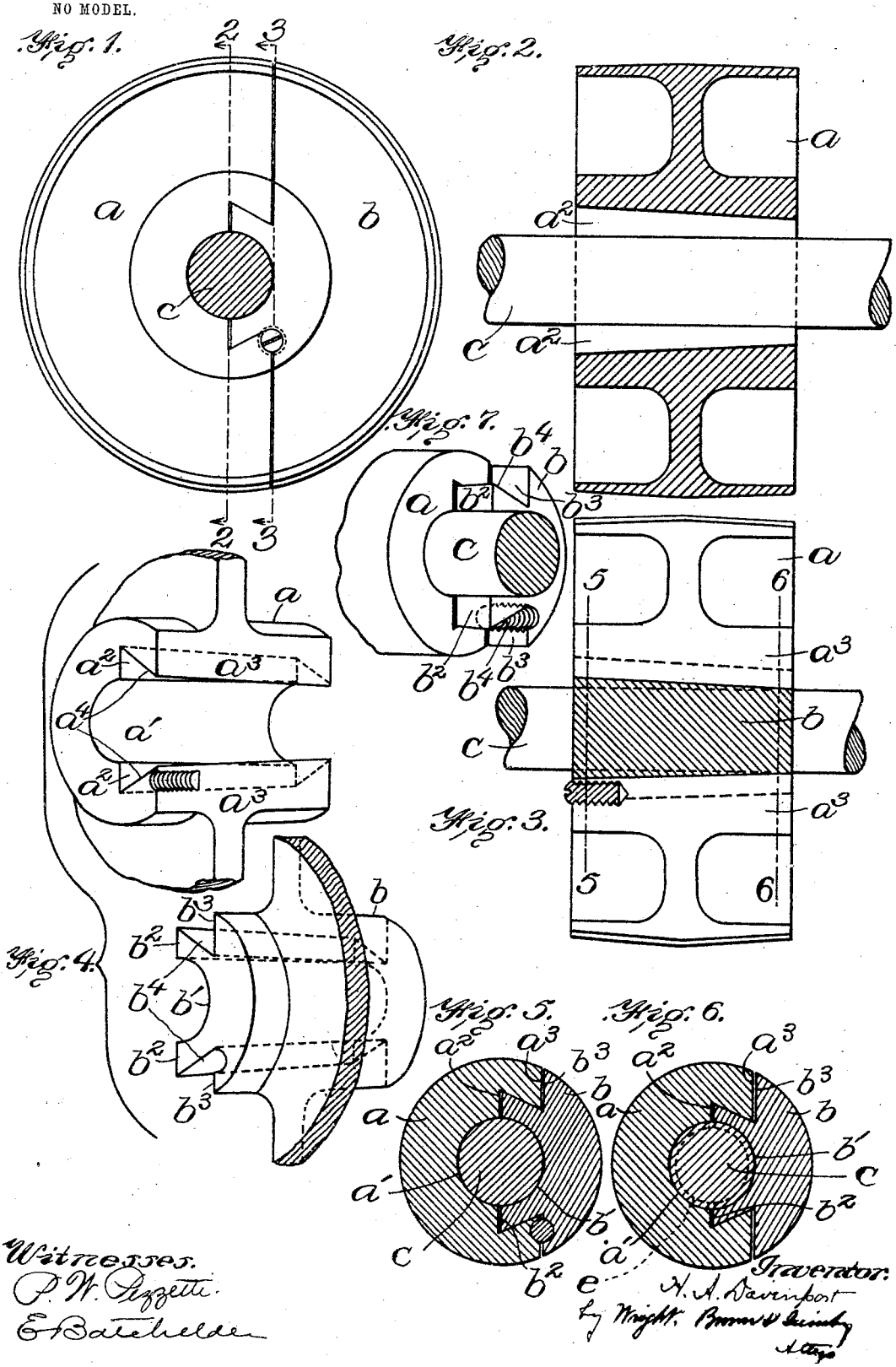

No. 774,965.

Patented November 15, 1904.

UNITED STATES PATENT OFFICE.

HERMAN A. DAVENPORT, OF BROCKTON, MASSACHUSETTS, ASSIGNOR OF ONE-HALF TO LEONARD H. HAMEL, OF BEVERLY, MASSACHUSETTS.

SPLIT PULLEY.

SPECIFICATION forming part of Letters Patent No. 774,965, dated November 15, 1904.

Application filed February 27, 1904. Serial No. 195,552. (No model.)

*To all whom it may concern:*

Be it known that I, HERMAN A. DAVENPORT, of Brockton, in the county of Plymouth and State of Massachusetts, have invented certain new and useful Improvements in Split Pulleys, of which the following is a specification.

This invention relates to pulleys of the sectional type designed to be applied to shafting without disconnecting the latter or removing it from its bearings.

As is well known, it is frequently desirable that a pulley shall be applied to a shaft intermediate its ends, and many attempts have been made to provide a sectional pulley or roll which may be readily removed from the shaft which supports and drives it or which it drives and which may be reapplied thereto, either to enable different rolls or pulleys to be used interchangeably with the same shaft or so as to apply a pulley in a particularly desirable location. Pulleys of this type have been provided which require a splined connection with the shaft or an equivalent means for rotatably securing the shaft and pulley.

The object of this invention is to provide a pulley of this character in which no clutch or rib or equivalent device is required, which pulley shall be self-tightening upon the shaft by the simple endwise movement of the sections or members relatively to each other when said sections are being applied, a reverse endwise movement disconnecting the sections from the shaft.

To these ends the invention consists in the construction and combination of parts, substantially as hereinafter described and claimed.

Of the accompanying drawings, forming a part of this specification, Figure 1 represents a side elevation of a pulley embodying my invention, the two members of the pulley being secured upon a shaft, the latter being represented in section. Fig. 2 represents a section on line 2 2 of Fig. 1 looking in the direction of the arrows. Fig. 3 represents a section on line 3 3 of Fig. 1 looking in the direction of the arrows. Fig. 4 represents the hub portions of the two sections of the pulley in perspective and detached from each other. Fig. 5 represents a detail section of the hub portion of the pulley on line 5 5 of Fig. 3. Fig. 6 represents a section similar to Fig. 5, but on the line 6 6 of Fig. 3. Fig. 7 is a detail perspective showing the hub portions of the pulley when the sections are partially secured together and to the shaft.

Similar reference characters indicate the same parts in all the figures.

The two sections of the pulley are represented as a whole at $a$ and $b$. The said sections are formed, respectively, with semicylindrical shaft-seats $a'$ and $b'$, which are preferably formed of a diameter slightly less than that of the shaft $c$, to which the pulley is to be secured. The section $a$ is formed with two radial faces $a^2$—that is, each face $a^2$ is in a plane radial to the axis of the pulley and leads from the margin of the shaft-seat. The section $b$ is provided with faces $b^2$, which are also radial to the axis of the pulley and lead from the opposite margins of the shaft-seat of said section.

In planes at one side of and parallel with the planes of the radial faces $a^2\ b^2$ the sections $a$ and $b$ are formed with faces $a^3$ and $b^3$, respectively, which are tangential to the axis of the pulley, and the said tangential and radial faces are connected by faces $a^4$ and $b^4$ of the sections $a$ and $b$, respectively, the said connecting-faces $a^4$ and $b^4$ being tapered endwise relatively to the axis of the pulley and being laterally inclined, so as to meet the inner radial faces $a^2\ b^2$ and outer tangential faces $a^3\ b^3$ at acute angles, as will be readily apparent, particularly in Figs. 5 and 6.

It will now be understood that when the two sections or members of the pulley are placed against opposite sides of the shaft, but laterally displaced relatively to each other, so that the narrow ends of the ribs which project from the section $b$ can be slipped into the recesses between the faces $a^2$ and $a^4$ of section $a$, a lateral movement of the two sections relatively to each other, so that the said ribs of the section $a$ will move endwise of the hub portion of the section $a$, will cause the two sections to bind firmly upon the shaft. This action is due to the faces $a^4$ and $b^4$ being inclined both laterally and endwise, so that the relative endwise movement of the two sections after placing them upon the shaft will cause the two sections to closely approach each other and the shaft.

In order that the parts may be held so that they cannot by any possibility slip endwise relatively to each other, I may employ a locking device, such as a screw $b$, fitting in threaded half-sockets formed in two of the meeting faces $a^3$ and $b^3$ at one side of the shaft.

Preferably the internal diameter of the bore of the pulley formed by the two semicylindrical shaft-seats will be a trifle under the size of the shaft—as, for instance, five one-thousandths of an inch. This not only allows for a practical clamping action, although there may be a slight variation in the size of the shaft, but it also causes the edges or margins of the shaft-seats to bite into the shaft as the two sections are strongly drawn toward each other. The biting edges of the two sections are of course diametrically opposite each other, and owing to the fact that the faces $a^2$ $b^2$ are radial the said biting edges are angular, and therefore capable of forcing their way slightly into the periphery of the shaft when the latter is a trifle larger in diameter than the diameter of the pulley-bore as a whole.

It will be readily understood that if the pulley is to be applied to a shaft that is considerably smaller than the bore of the pulley a bushing $e$, such as represented by dotted lines in Fig. 6, may be first placed upon the shaft, said bushing being pinched or jammed or wedged between the shaft and the semicylindrical seats of the pulley-sections.

While I have employed the terms "radial" and "tangential," it is to be understood that these words are not to be construed in a limiting sense, for the reason that the faces $a^2$ $b^2$ and $a^4$ $b^4$ might be in other than true flat planes and still fall within the scope of my invention.

I claim—

1. A split pulley having its sections each provided with a practically semicylindrical shaft-seat, two inner faces leading from the margins of the shaft-seat in planes radial to the axis of the pulley, two outer faces in planes tangential to said axis, and two connecting-faces in planes tapered endwise of said axis and meeting the inner and outer faces at acute angles, whereby when the sections are moved longitudinally of the shaft the edges of the shaft-seats will bite into said shaft.

2. A split pulley having its sections each provided with a practically semicylindrical shaft-seat, and with interlocking faces inclined laterally and endwise, the edges of the shaft-seats being formed to bite or cut into the periphery of the shaft to which the pulley is to be secured when said sections are moved endwise relatively to said shaft.

3. A split pulley having its sections each provided with an exactly semicylindrical shaft-seat, two inner faces leading from the margins of the shaft-seat in planes radial to the axis of the pulley, two outer faces in planes tangential to said axis, and two connecting-faces in planes tapered endwise of said axis and meeting the inner and outer faces at acute angles, means being provided for preventing relative endwise movement of the sections after they have been secured to the shaft, whereby when the sections are moved longitudinally of the shaft the edges of the shaft-seats will bite into said shaft.

In testimony whereof I have affixed my signature in presence of two witnesses.

HERMAN A. DAVENPORT.

Witnesses:
A. W. HARRISON,
R. M. PIERSON.